April 12, 1938.  O. C. KAVLE  2,113,843
APPARATUS FOR CUTTING OR STAMPING ARTICLES FROM SHEET MATERIAL
Original Filed Dec. 20, 1934   2 Sheets-Sheet 1
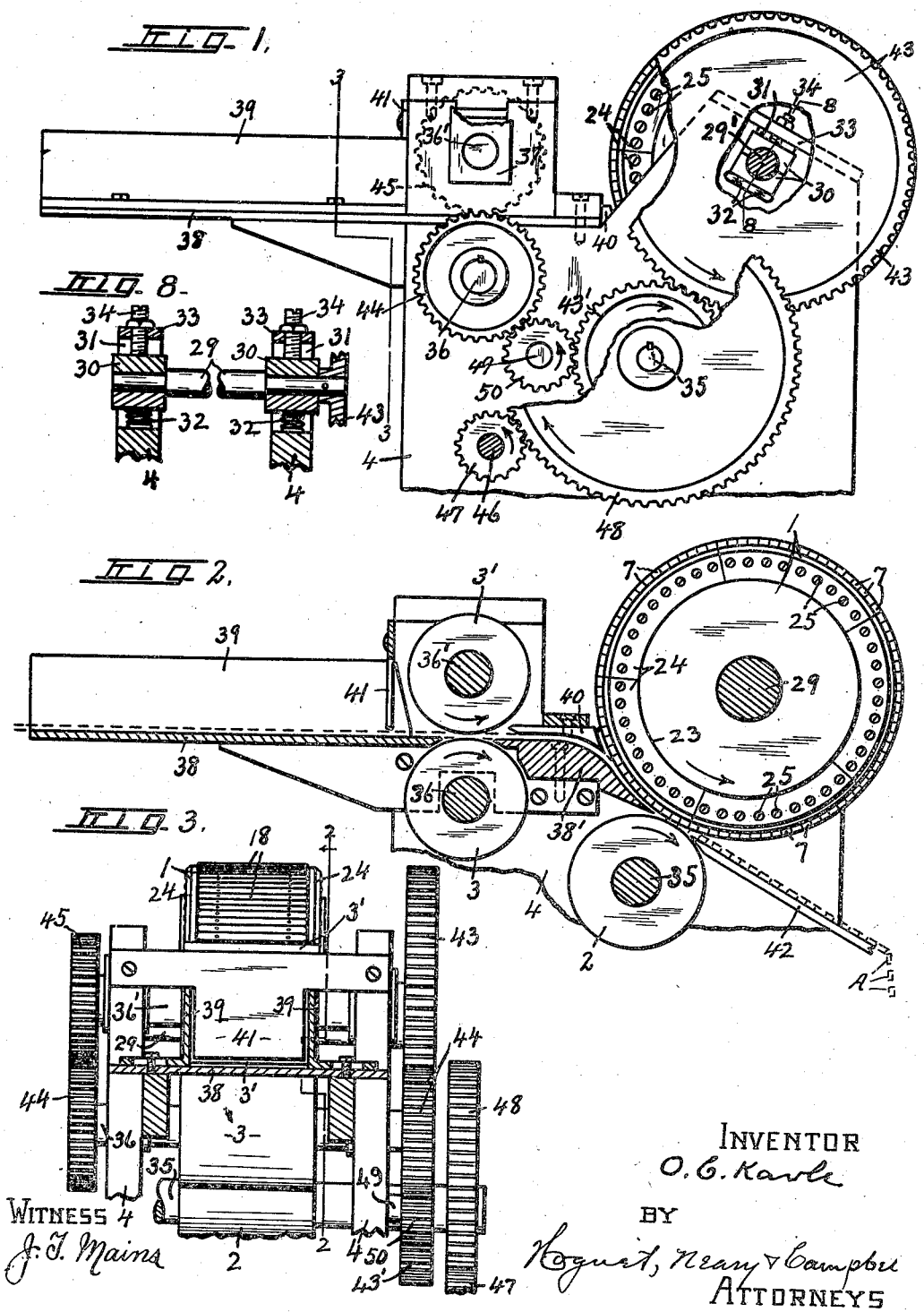
INVENTOR
O. C. Kavle
BY
Hoguet, Neary & Campbell
ATTORNEYS
WITNESS
J. T. Mains

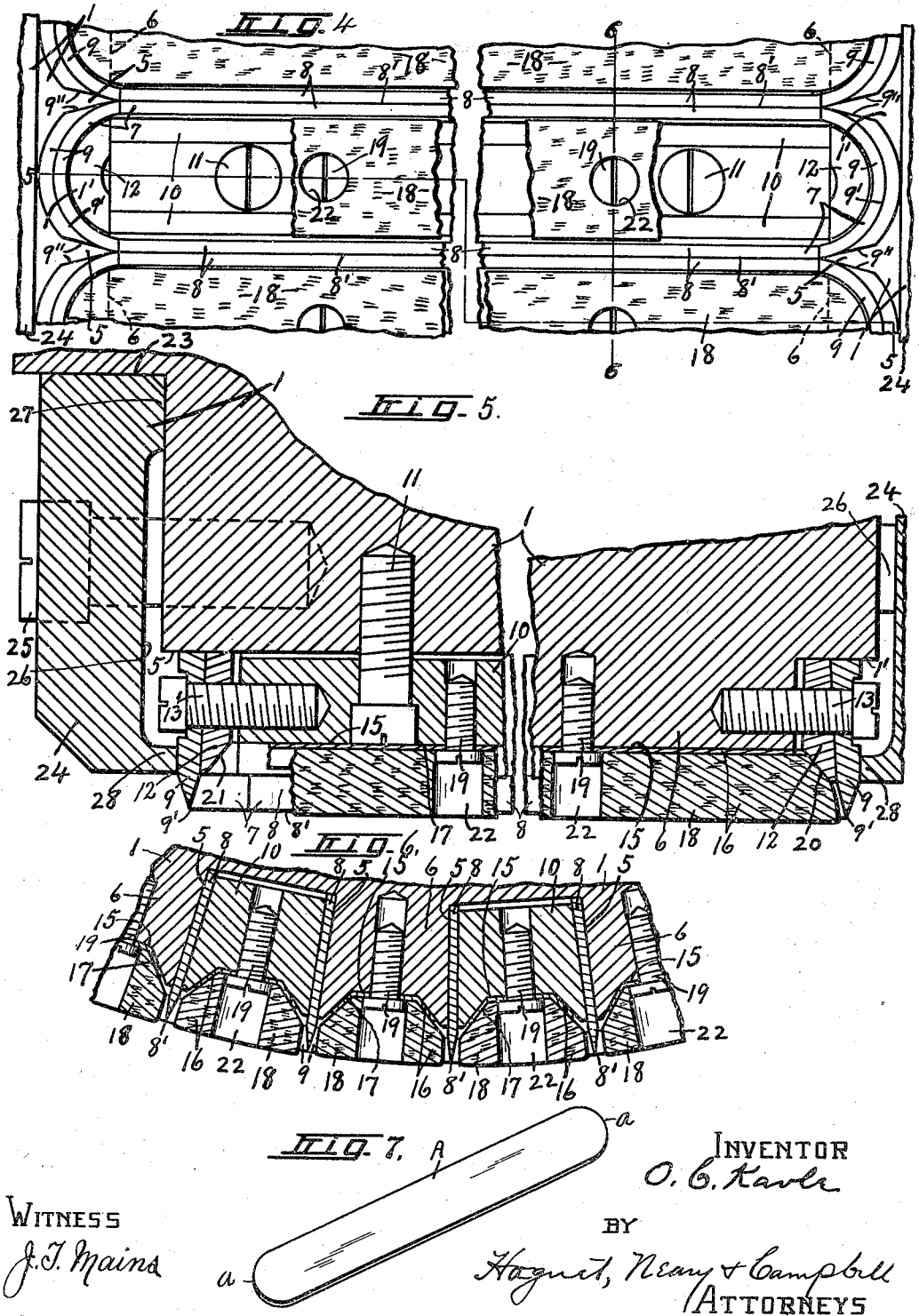

Patented Apr. 12, 1938

2,113,843

UNITED STATES PATENT OFFICE 2,113,843

APPARATUS FOR CUTTING OR STAMPING ARTICLES FROM SHEET MATERIAL

Oscar C. Kavle, Syracuse, N. Y.

Application December 20, 1934, Serial No. 758,427
Renewed March 26, 1937

24 Claims. (Cl. 164—28)

This invention relates to an apparatus for cutting or stamping articles from sheet material and involves the use of a continuously moving cutter-carrier and a platen arranged in opposed cutting relation for receiving the material between them and constitutes what may be termed a stamping couple in which a multiplicity of cutters are mounted in sequence upon the carrier in the direction of movement thereof to move therewith for impinging the registering portions of the material against the platen and thereby successively cutting the articles therefrom in a single operation without interruption.

The main object is to provide a simple, compact and comparatively inexpensive machine of this character which is capable of cutting a far greater number of articles from the sheet material in a given period of time with less waste of material and the expenditure of less labor and power than has heretofore been practised.

One of the specific objects is to enable the machine to be used for cutting elongated articles from sheets or strips of wood-veneer in such manner that the grain of the wood may extend lengthwise of the articles to impart strength and resiliency thereto.

Another object is to make each cutter to conform to the outline of the article required and to arrange the several cutters around and upon the periphery of the carrier in such manner that each lengthwise side portion may form one side of two adjacent cutters and also that the end portions of two adjacent cutters may form continuations of each lengthwise side portion.

A further object is to make the lengthwise side portions and end portions of each cutter as separate sections so that each section may be removed or replaced without disturbing the remaining sections or the sections of the remaining cutters.

Another object is to provide adjustable means for regulating the depth of cut of the cutters into the work and thereby to prevent contact of the cutting edges with the platen and also to compensate for wear.

A further object is to provide each cutter with yielding means for automatically ejecting the article therefrom immediately following the cutting operation and to permit the removal or replacement of any one of the ejectors without disturbing the cutters.

Other objects and uses will be brought out in the following description.

In the drawings:—

Figure 1 is a side elevation, partly broken away, of a stamping machine embodying various features of the invention.

Figure 2 is a longitudinal sectional view of the same machine taken on line 2—2, Figure 3.

Figure 3 is a transverse vertical sectional view taken on line 3—3, Figure 1.

Figure 4 is an enlarged face view, partly broken away, of a portion of the cutter roller showing more particularly the relation of the cutter blades and adjacent ejectors and fastening means therefor, the thickness of the cutter sections being abnormally enlarged.

Figure 5 is a longitudinal sectional view, partly broken away, of a portion of the cutter roller taken on line 5—5, Figure 4.

Figure 6 is a transverse vertical sectional view taken on line 6—6, Figure 4.

Figure 7 is a perspective view of one of the articles as cut by the machine from the sheet material.

Figure 8 is an enlarged detail sectional view taken in the plane of line 8—8, Figure 1, illustrating the end portions of the cutting roller shaft and the bearing support therefor.

The machine shown is adapted to be used more particularly for cutting spatulas, confection-holders and other oblong articles from sheets or strips of wood veneer in such manner that the grain of the wood will extend lengthwise of each article for increasing its strength and resiliency when in use and for this purpose the machine comprises a cutting roller 1, a platen roller 2 and a pair of feeding rollers 3 and 3', all of which are mounted in or upon a main supporting frame 4 to rotate about parallel horizontal axes and are positively driven at predetermined speed through the medium of suitable gearing as shown more clearly in Figures 1, 2, and 3 and hereafter more fully described.

The cutting roller 1 and platen 2 constitute a stamping couple in which the roller 1 is of considerably greater diameter and peripheral length than the platen and is provided with a multiplicity of axially elongated grooves 5 and ribs 6 extending inwardly from the periphery thereof and alternating with each other in equally spaced relation from center to center circumferentially for receiving and supporting a corresponding number of cutters 7, as shown more clearly in Figures 4, 5, and 6.

Cutting roller

The grooves 5 extend lengthwise of and parallel with the axis of the roller from end to end thereof and are of uniform circumferential width and also of uniform radial depth somewhat less than the radial depth of the cutters so that when the inner edges of the cutters are seated against the bottoms of their respective grooves their outer cutting edges may project beyond the periphery of the roller for impressing the registering portions of the sheet material against the periphery of the platen 2 and thereby cutting the articles therefrom to the required form in one continuous movement.

The opposite walls of each groove 5, which, in this instance, are defined by the adjacent sides of the ribs 6, are preferably flat and are disposed in planes radial to the axis of the roller 1 and therefore, in inwardly convergent planes for engaging the lengthwise sides of the cutters and thereby to assist in holding the latter in operative position.

The ribs 6 are of uniform length somewhat less than the face width of the roller and preferably terminate equal distances from the ends thereof to form peripheral bearings 1' for the inner edges of the corresponding end blades or cutter sections, said ribs being also of uniform radial depth equal to the radial depth of the grooves 5, as shown more clearly in Figure 5.

The cutters shown are composed of a multiplicity of similar and interchangeable flat blades 8 and oppositely curved end blades 9, all of which are preferably made of hardened steel and are assembled upon the carrier 1 in such manner as to form, respectively, the lengthwise sides and ends of a series of elongated tubular or cup-shaped cutters each conforming to the outline of one of the articles required as shown in Figure 7.

To this end the blades 8 are arranged edgewise within the grooves 5 in uniformly spaced relation about the axis of the carrier and in different inwardly converging planes radial to said axis to rest flatwise against the opposite side walls of the grooves 5 and ribs 6 with their inner edges seated on the bottoms of the grooves and their outer cutting edges projecting beyond the periphery of the carrier so that each blade 8 may form the lengthwise sides of two adjacent articles in one operation.

It is now clear that a set of two of the blades 8 are arranged lengthwise of and within each of the grooves 5 in engagement with the adjacent ribs 6 and that each of said blades is common to and forms the lengthwise sides of two adjacent articles without waste.

The blades 8 in each of the grooves 5 are rigidly but releasably held in spaced relation against the sides of adjacent ribs 6 by means of a clamping block 10 which extends lengthwise of and between the blades from end to end thereof and within the corresponding groove 5 and is of sufficient transverse width to simultaneously engage both blades when the latter are placed in operative position, see Figs. 5 and 6.

Each clamping block 10 is secured to the peripheral portion of the carrier 1 by means of bolts 11 and its opposite lengthwise sides are preferably disposed in inwardly converging radial planes for engaging the blades with a wedging action when the bolts 11 are tightened and thereby frictionally locking said blades in operative position, it being understood that the block will be of less radial depth than the blades 8 and groove 5 to assure sufficient radial adjustment thereof to firmly hold the blades in engagement with the adjacent ribs 6 against relative radial or circumferential movement and thus cause the cutting edges of all of the blades to travel in the same circle concentric with the axis of the carrier, see Figures 4 and 5.

The end blades 9 are also similar and interchangeable and of the same radial depth as the flat blades 8 and are arranged in sequence circumferentially around and upon the corresponding peripheral seats 1' at opposite ends of the grooves 5 and ribs 6 so as to bridge across the adjacent ends of the flat blades 8 to form continuations thereof, as shown in Figures 4 and 5.

Each of the end blades 9 is preferably made in the form of a circular segment of the same circumferential length as the distance between the cutting edges 8' of the adjacent blades 8 and is provided with a cutting edge 9' having its opposite ends registering with the adjacent ends of the cutting edges of two successive blades 8 for continuing the cut across the ends of both flat blades.

These end blades 9 are arranged in pairs at opposite ends of their respective grooves 5 and ribs 6 with the convex sides of those of each pair facing outwardly or in opposite directions and their opposite ends abutting against the adjacent ends of the corresponding flat blades 8 to form the rounded ends of an article A, Figure 7, in one continuous operation, while the blades 8 are forming the lengthwise sides of said article.

The thickness of each terminal of each end blade 9 is preferably equal to one-half the thickness of each of the flat blades 8 so that contiguous terminals may abut against each other and also against the end face of the adjacent flat blade 8 whereby one-half of each blade 8 of each pair and the corresponding end blades 9 constitute a complete cutter unit and each flat blade is common to and forms one side of two adjacent cutters, thus permitting the use of a relatively large number of cutting units on the periphery of a roller of comparatively small diameter for producing a corresponding number of articles at each revolution of the roller.

The contiguous end faces 9" of adjacent end blades 9 are disposed in outwardly divergent planes to form an intervening space for receiving the registering portions of the sheet material during the cutting of the articles therefrom and thereby to free the end remnants of said sheet and also to reduce friction incidental to the cutting operation.

The ribs 6 and clamping blocks 10 are of equal length slightly greater than the blades 8 to extend beyond the ends thereof and are provided with tapered ends projecting between and against the ends of the arcuate blades for bracing the latter against relative circumferential movement.

The end blades 9 are further reinforced by plano-convex filler pieces 12 which are interposed between said blades and the end faces of the corresponding ribs 6 and clamping blocks 10 respectively with their convex sides closely fitting against the concave faces of the blades and their flat faces engaging the adjacent end faces of the corresponding ribs and blocks and their inner edges resting respectively against the bottoms of the corresponding grooves 5 and peripheral bearings 1', as shown in Figure 5.

The end blades 9 and filler pieces 12 at opposite ends of each rib 6 are secured to each other and to the adjacent ends of the ribs by bolts 13, while the end blades 9 and filler pieces 12 at opposite ends of each clamping block 10 are secured to each other and to the adjacent ends of the block by bolts 13' similar to the bolts 13, as shown more clearly in Figure 5, it being understood that each block 10 is rigidly but releasably secured to the cutter roll 1 by the bolts 11 and that the removal of said bolts will permit the block, together with its end blades 9 and other parts carried thereby to be removed and replaced without disturbing the remaining blocks, thus allowing the corresponding flat blades 8 to be removed or replaced.

Ejector units

The outer peripheral sides of the ribs 6 and clamping blocks 10 are provided with similar lengthwise grooves 15 extending from end to end thereof and preferably of angular trough-like cross section for receiving a corresponding number of ejector units 16, each consisting of a plate or base 17 of relatively thin sheet metal and a somewhat thicker bar 18 of cork or other suitable resilient or elastic material, as shown more clearly in Figures 4, 5, and 6.

Each of the plates 17 is also of trough-like cross section to conform to the cross sectional contour of the corresponding groove 15 in which it is removably seated to extend from end to end thereof and is held in its operative position by bolts 19, as shown in Figures 4, 5, and 6.

The resilient bars 18 are adhesively or otherwise secured to and within the outer channeled sides of their respective plates 17 to extend longitudinally beyond the opposite ends thereof and radially slightly beyond the arc of travel of the cutting edges of the blades 8 and 9 to engage the registering portions of the sheet material between said blades with a yielding pressure during the cutting operation and thereby to displace the article from the remaining portions of said sheet material immediately following the cutting operation.

Each of the resilient bars 18 is of slightly less circumferential width than the distance between adjacent blades 8 and also of slightly less axial length than the distance between the end blades 9 to allow free compression and expansion of said bar during and immediately following the cutting operation, the inner side of each bar 18 being made to conform to the cross sectional contour of the adjacent groove 5 and plate 17, while the outer faces of said bars are normally concentric with the axis of the roller 1, as shown in Figure 6.

The opposite ends of each bar 18 are preferably rounded to conform to the curvature of the adjacent end blades 9 and are also beveled at 20 to abut against similarly beveled faces 21 on the inner faces of the outer edges of said filler blocks 12, as shown more clearly in Figure 5, each bar 18 being provided with radial openings 22 therethrough to permit access to the bolts 19 so that any one of the ejector units may be removed or replaced without disturbing the remaining units, cutting blades 8 or 9, or the clamping blocks 10, see Figure 5.

Clamping collars

The opposite ends of the cutting roller 1 are reduced in diameter to form annular bearings 23 upon which are mounted clamping collars 24 which are secured to the adjacent ends of the roller by bolts 25 to extend radially beyond the heads of the bolts 13 and 13' for the end blades and are provided with annular recesses 26 for receiving said heads. These recesses form inner and outer annular flanges 27 and 28 abutting respectively against the adjacent ends of the roller 1 and against the outer convex faces of the corresponding end blades 9 to assist in holding the latter in engagement with the contiguous ends of the flat blades 8 and thereby to keep the cutting edges of the end blades in exact alinement with those of the flat blades for forming the tubular or cup-shaped cutting units 7 previously described, see Figures 4 and 5.

These collars 24 are preferably made in sectors or segments of equal circumferential length, as shown more clearly in Figures 1 and 2, to facilitate the removal or replacement of any one or more of the end blades within the circumferential length of each segment without disturbing the other segments, it being understood that the cutting edges of the blades 8 and 9 will extend radially beyond the peripheries of the collars.

Radial adjustment

The cutting roller 1 is mounted upon the intermediate portion of a rotary supporting shaft 29 extending beyond the opposite ends of the roller to form trunnions 29' which are journaled in suitable bearings 30 on the frame 4 to rotate about an axis in planes some distance above and at the rear of the axis of the platen 2 so that the major portions of the roller 1 may be similarly disposed in planes above and at the rear of the axis of said platen for convenience of access to the cutting blades and other parts carried by the cutting roller 1 and also to reduce the vertical height of the machine, as shown more clearly in Figures 1 and 2.

The axes of the rollers 1 and 2 are, therefore, disposed in an upwardly and rearwardly inclined plane so that the axis of the roller 1 may be offset rearwardly beyond the vertical plane of the axis of the roller 2 for the purpose above described.

The bearings 30 for the roller 1 are mounted in radial slots 31 in corresponding sides of the frame 4 and are preferably divided at right angles to the slot in the plane of the axis of the roller for convenience of assembly upon the trunnions 29', as shown in Figure 1.

Suitable springs 32 are interposed between the bottoms of the slots 31 and inner faces of the bearings 30 and are tensioned to support the entire weight of the cutting roller 1 and parts carried thereby and to normally urge said roller outwardly and radially away from the platen roller 2 to prevent direct contact of the cutting edges of the blades 8 and 9 with the periphery of said platen roller.

The outer ends of the slots 31 are closed by cap-plates 33 which are bolted or otherwise removably secured to the adjacent portions of the frame 4 and are provided with threaded apertures for receiving suitable adjusting screws 34.

The adjusting screws 34 and springs 32 constitute means for moving the cutting roller radially toward and from the platen roller for regulating the depth of cut of the blades 8 and 9 into the sheet material sufficient to sever the articles therefrom without actual contact of the cutting edges of the blades 8 and 9 with the platen.

Platen roller

The platen roller 2 is cylindrical and of about the same axial length as the cutting roller 1 and is mounted upon a rotary shaft 35 which extends beyond opposite sides of the frame 4 parallel with the shaft 29 and has its opposite ends journaled in relatively fixed bearings in said sides to hold the platen roller against radial movement.

Feeding means

The feeding rollers 3 and 3' are arranged in opposite relation one above the other at the front of and in spaced relation to the cutting roller 1 and platen roller 2 with their adjacent faces in a horizontal plane some distance above that of the contiguous faces of the rollers 1 and 2 or between the shafts 29 and 35 and are mounted upon parallel shafts 36 and 36' having their opposite ends journaled in suitable bearings in corresponding sides of the frame 4, as shown in Figures 1, 2, and 3.

The bearings for the lower shaft 36 are preferably fixed to hold its roller 3 against radial movement, while the bearings as 37 for the upper roller 3' may be adjusted radially and vertically to bring its roller into proper relation to the lower roller 3 for feeding the sheet material to and between the rollers 1 and 2.

Feeding table

The sheet material is fed by hand or otherwise to the feeding rollers 3 and 3' along a horizontal bed or table 38 and between opposite upright guide members 39 forming parts of the frame 4 at the front of said feeding rollers, the upper surface of the table and adjacent faces of the rollers 3 and 3' being disposed in about the same horizontal plane.

The table 38 is provided with a rearwardly projecting extension 38' between the feeding rollers and cutting rollers and having the upper face of its front end disposed in about the same plane as that of the front portion 38 and the upper face of its front end inclined and curved rearwardly and downwardly in substantially concentric slightly spaced relation to the roller 1 to terminate between and tangential to the adjacent peripheries of the rollers 1 and 2, as shown more clearly in Figure 2, for directing the material between said rollers.

A deflector plate 40 is mounted on the frame 4 between the upper feeding roller 3' and cutting roller 1 and just above the extension 38' in spaced relation thereto for deflecting the infeeding sheet material along and upon the upper surface of said extension and against the downwardly moving front lower side of said cutting roller, as shown in Figure 2.

A suitable stop or detent 41 is mounted on the frame 4 directly at the front of the upper feed roller 3' and above the table 38 in spaced relation to the upper surface of the latter a distance corresponding approximately to a single thickness of the sheet material to prevent the feeding of more than one sheet at a time to the cutting roller.

A delivery chute 42 is mounted upon the frame 4 to extend downwardly and rearwardly from and preferably tangential to the peripheries of the adjacent sides of the rollers 1 and 2 for guiding the severed articles from the machine into a receptacle, not shown.

Gearing

Any suitable means may be provided for positively and continuously rotating the cutting roller 1 and platen roller 2 and also the feeding rollers 3 and 3' in such manner that the contiguous faces of each set will be moved at the same rate of speed in the same direction. For this purpose, the corresponding outer ends of the shafts 29 and 35 for the cutting roller 1 and platen roller 2, are provided respectively with intermeshing gears 43 and 43' of about the same diametrical pitch as the diameters of the corresponding rollers, while the opposite ends of the shafts 36 and 36' for the feeding rollers 3 and 3' are also provided with gears 44 and 45 of the same diametrical pitch as the diameters of said feeding rollers.

A power driven drive shaft 46 is journaled in suitable bearings in the frame 4, and is provided on its outer end with a pinion 47 meshing with a relatively large gear 48 on the shaft 35 of the platen roller 2.

A stub shaft 49 is journaled in suitable bearings in the frame 4 and is provided with an idler gear 50 meshing with the gear 43' on the platen shaft 35 and also with the gear 44 on the lower feed roller shaft 36, said gears being ratioed in such manner as to cause the adjacent faces of the rollers 1 and 2 and also the adjacent faces of the feeding rollers 3 and 3' to travel at the same rate of speed in the direction indicated by the arrows, Figures 1 and 2.

Operation

The face widths of the rollers 1 and 2 and also the feed rollers 3 and 3' are substantially equal, corresponding approximately to the transverse width of the strips of sheet material as the latter are fed into the machine, the distance between the upright guides 39 being also substantially equal to or of slightly greater width than the width of said strip and alined with opposite ends of the feed rollers to properly guide the strip between the rollers.

As previously stated, these strips are cut from the sheets of wood veneer, crosswise of the grain, to a predetermined width slightly greater than the length of the cutters on the cutting roll 1 so that when fed between the cutting roll and platen, the strips will be cut into the desired articles with the grain of the good running lengthwise thereof.

As the strips are fed along the upper surface of the table 38 between the guide members 39 to the feed rollers 3 and 3', the latter will positively feed said strip forwardly to and between the cutting roller and platen roller 2, but immediately following the passage of the strip between the feeding rollers, the forward end of the strip will be deflected downwardly by the deflector member 40 along and upon the downwardly inclined upper face of the extension 38' in substantially concentric relation with roller 1 whereby the surface of the sheet material engaged by the cutting blades 8 will be maintained substantially normal to the blades as they approach the cutting line between the rollers, and thus cause the passage of the edge of each blade through the strip material at substantially right angles to either side surfaces thereof to produce articles such as A having the side edges thereof disposed in substantially normal relation to the side surfaces. The strip then passes between the rollers 1 and 2 at right angles to a direct line between the axes of the cutting roller and platen roller, as shown more clearly in Figure 2.

The cutters on the cutting roller 1 then impinge the registering portions of the sheet material against the adjacent face of the platen roller 2 to cut the articles therefrom, which articles are then fed forwardly and downwardly along the inclined chute 42 and disposed in any suitable receptacle, not shown.

The space between the lower end of the stop or detent 41 and upper surface of the feeding table 38 is substantially equal to the thickness of the strip of sheet material so that in case the strips should be stacked one upon the other upon said table, only the lower strip could be fed forwardly between the feeding rolls, the others being held back by the stop 41 ready to permit the lowermost strip to drop onto the table after the first strip has been moved forwardly by the feed rolls.

It will be noted that the strips are fed continuously between the cutting roller 1 and platen roller 2, thereby successively cutting the articles therefrom without appreciable waste for the reason that each flat blade 8 forms the adjacent sides of two successive articles, while the oppositely curved end blades simultaneously form the rounded ends of said articles A due to the fact that the opposite longitudinal edges of the sheet material project slightly beyond the convex cutting edges of the end blades 9, leaving only a small remnant waste at the edges of the strip as the articles are cut therefrom by the cutting roller 1.

Although I have shown and described a machine for cutting elongated articles from strips of wood veneer crosswise of the grain, it will be evident that the same machine may be used for cutting articles from cardboard or other sheet material and that the form of the cutters may be changed without departing from the spirit of the invention.

I claim:

1. In a machine for cutting articles from sheet material, a rotary carrier and a rotary platen arranged to receive the sheet material between them, in combination with cutter blades mounted on the carrier lengthwise of its axis and in circumferentially spaced relation, oppositely curved end cutting blades having their ends abutting against corresponding ends of the lengthwise blades with the cutting edges thereof at said ends extending in substantially longitudinal alignment with the cutting edges of corresponding lengthwise blades, the contiguous end faces of adjacent end blades being disposed in outwardly divergent planes to form an intervening space for receiving the registering portions of the sheet material therein, and means for holding said blades in operative position on the carrier with their cutting edges operatively facing the platen for cutting the articles from the material.

2. In a machine for cutting articles from sheet material, opposed rollers between which the material is adapted to be fed, one of said rollers having an axially extending groove in its periphery, a pair of cutting blades seated in said groove lengthwise thereof, additional cutting blades extending across opposite ends of the groove and abutting against corresponding ends of the first blades, and releasable devices for holding said blades in operative position.

3. In a machine for cutting articles from sheet material, opposed rollers between which the material is adapted to be fed, one of said rollers having an axially extending groove in its periphery, a pair of cutting blades seated in said groove lengthwise thereof, oppositely curved cutting blades extending across opposite ends of the groove and having their opposite ends abutting against the corresponding ends of the first blades, and releasable devices for holding said blades in operative position.

4. In a machine for cutting articles from sheet material, a carrier element and a platen element arranged in opposed relation to each other for receiving the material between them, said carrier element having an axially extending peripheral rib, a pair of cutting blades seated against opposite lengthwise faces of the rib, additional cutter blades extending across opposite ends of said rib and abutting against corresponding ends of the first blades, and devices for holding said blades in operative position.

5. A machine for cutting articles from sheet material as in claim 4 in which the additional blades are curved axially in opposite directions.

6. In a machine for cutting articles from sheet material, opposed rollers adapted to receive the material between them, one of the rollers having an axially extending peripheral groove, a pair of cutting blades seated against the opposite side walls of the groove in spaced relation and having their cutting edges arranged to impinge the material against the periphery of the other roller, and a clamping block releasably secured in said groove between and in engagement with said blades to hold the latter against their respective side walls of the groove.

7. A machine for cutting articles from sheet material as in claim 6 in which the side walls of the groove are disposed in inwardly convergent planes.

8. A machine for cutting articles from sheet material as in claim 6 in which the side walls of the groove and opposite faces of the clamping block are disposed in inwardly convergent planes.

9. In a machine for cutting articles from sheet material, opposed rollers adapted to receive the material between them, one of the rollers having an axially extending peripheral groove, a pair of cutting blades seated against the opposite side walls of the groove in spaced relation and having their cutting edges arranged to impinge the material against the periphery of the other roller, a filler piece secured in said groove between and against the blades for holding the latter in operative position, and a yielding ejector member secured to the outer face of the filler piece.

10. In a machine for cutting articles from sheet material, opposed rollers adapted to receive the material between them, one of the rollers having an axially extending peripheral groove, a pair of cutting blades seated against the opposite side walls of the groove in spaced relation and having their cutting edges arranged to impinge the material against the periphery of the other roller, a filler piece secured in said groove between and against the blades for holding the latter in operative position, additional blades extending across the opposite ends of the filler piece and abutting against the corresponding ends of the first blades, reinforcing members between the second blades and adjacent ends of the filler piece, and devices for securing the additional blades and reinforcing members to the corresponding roller.

11. In a machine for cutting articles from sheet material, a platen element and a cutting element both rotatable about horizontal axes for receiving the material between them, cutters on the cutting element cooperating with the platen for cutting the articles from said sheet material, the axis of the cutting element being arranged some distance in front of the vertical plane of the axis of the platen element and in front of the cutting line, whereby the lower side of the cutting element directly below its axis will be in a plane below said cutting line for positively deflecting the severed articles downwardly, and means for directing the infeeding material to the cutting line at right angles to a direct line between said axis, said latter means including a guide member arranged to extend adjacent the cutting element from a position in proximity to the cutting line rearwardly in substantially concentric relation with said cutting element for maintaining the surface of the sheet material engaged by the cutters substantially normal to said cutters as the same approaches the cutting line.

12. In a machine for cutting articles from sheet material, a platen element and a cutting element both rotatably supported for receiving the sheet material between them, cutters on the cutting element cooperating with the platen element for cutting articles from said sheet material, and means for directing the infeeding material to the cutting line at right angles to a direct line between the axes of said rotatable elements, said latter means including a guide member arranged to extend adjacent the cutting element from a position in proximity to the cutting line rearwardly in substantially concentric relation with said cutting element for maintaining the surface of the sheet material engaged by the cutters substantially normal to said cutters as the same approaches the cutting line.

13. In a machine for cutting articles from sheet material, opposed rollers arranged to receive the sheet material between them, one of said rollers having a plurality of axially extending peripheral grooves and ribs arranged in alternate relation with each other circumferentially of the roller, a pair of cutting blades seated in each groove against corresponding lengthwise faces of the ribs, oppositely curved end cutting blades extending across opposite ends of said grooves having their ends abutting against corresponding ends of the lengthwise blades, additional oppositely curved end cutting blades extending across opposite ends of said ribs having their ends abutting against corresponding ends of said lengthwise blades abutted by the first mentioned end blades, said end blades having the cutting edges thereof at said ends terminating in substantially lengthwise alignment with the cutting edge of the corresponding lengthwise blades, the contiguous end faces of adjacent end blades being disposed in outwardly divergent planes to form an intervening space for receiving the registering portions of the sheet material therein.

14. In a machine for cutting articles from sheet material, opposed rollers adapted to receive the material between them, one of said rollers having an axially extending peripheral groove, a pair of cutting blades seated against the opposite side walls of said groove in spaced relation and having their cutting edges arranged to impinge the material against the periphery of the other roller, a filler piece secured in said groove between and against the blades for holding the latter in operative position, said filler piece having a lengthwise groove in the outer peripheral side thereof, a yielding ejector member mounted in the lengthwise groove of the filler piece, and means securing said ejector member to the filler piece.

15. In a machine for cutting articles from sheet material, opposed rollers adapted to receive the material between them, one of the rollers having a plurality of axially extending peripheral grooves and ribs arranged in alternate relation with each other circumferentially of the roll, a pair of cutting blades seated in each groove against corresponding lengthwise faces of the ribs arranged to impinge the material against the periphery of the other roller, a filler piece secured in each groove between and against the blades for holding the latter in operative position, and yielding ejector members secured to the outer faces of the filler pieces and said ribs.

16. In a machine for cutting articles from sheet material, opposed rollers adapted to receive the material between them, one of the rollers having a plurality of axially extending peripheral grooves and ribs arranged in alternate relation with each other circumferentially of the roll, a pair of cutting blades seated in each groove against corresponding lengthwise faces of the ribs arranged to impinge the material against the periphery of the other roller, a filler piece secured in each groove between and against the blades for holding the latter in operative position, each of said filler pieces and ribs being provided with lengthwise grooves in the outer peripheral sides thereof, yielding ejector members mounted in the grooves in said filler pieces and ribs, and means securing the ejector members in position.

17. In a machine for cutting articles from sheet material wherein a cutter supporting element and a platen element are arranged to operatively receive the sheet material between them, three or more longitudinally extending side cutting blades mounted on the supporting element in transverse spaced relation to each other, a plurality of end cutting blades mounted on the supporting element for joining an end of each side cutting blade with the corresponding end of an adjacent side blade, said end cutting blades having their ends abutting against corresponding ends of said side blades with the cutting edges thereof at said ends extending in substantially longitudinal alignment with the cutting edges of the corresponding side blades, the contiguous end surfaces of adjacent end blades being disposed in outwardly divergent planes to form an intervening space for receiving the registering portions of the sheet material therein.

18. In a machine for cutting articles from sheet material wherein a cutter supporting element and a platen element are arranged to operatively receive the sheet material between them, cutter blades on the cutter supporting element arranged in transverse spaced relation to each other and having their cutting edges arranged in spaced relation to the supporting element to impinge the sheet material against the platen element for cutting the articles from said sheet material, a plurality of ejector means one positioned between each pair of adjacent blades, each ejector means comprising a metallic base member and a cork member secured to the base member, and fastening means engaging the base member independently of the cork member releasably securing each ejector to the cutter supporting element with the cork member thereof normally extending to at least the transverse plane of the cutting edges of corresponding blades throughout substantially the entire length of said edges to engage the sheet material with a yielding pressure during the cutting operation, whereby the articles will be displaced from the blades as said blades move out of engagement with the remaining portion of said sheet material following the cutting operation.

19. In a machine for cutting articles from sheet material, opposed rollers adapted to receive the material between them, one of the rollers having an axially extending peripheral groove, a pair of cutting blades seated against opposite walls of the groove in spaced relation to each other and having their cutting edges extending beyond the peripheral surface of said latter roller to impinge the sheet material against the periphery of the other roller for cutting the articles from said material, a filler piece secured in said groove between and against the blades for holding the latter in operative position, and an ejector member secured to the outer face of the filler piece including a cork element arranged with the outer surface thereof terminating adjacent the cutting edges of the blades to engage the sheet material with a yielding pressure during the cutting operation, whereby the article will be displaced from the blades as said blades move out of engagement with the remaining portion of said sheet material following the cutting operation.

20. In a machine for cutting articles from sheet material, opposed rollers arranged to receive the sheet material between them, one of said rollers having a plurality of axially extending peripheral grooves and ribs arranged in alternate relation with each other circumferentially of the roller, a pair of cutting blades seated in each groove against corresponding lengthwise faces of the ribs, means including a holding member secured in each groove between and against the blades for holding the latter in operative position to impinge the material against the periphery of the other roller, and ejector members including cork elements secured to the outer faces of the holding members and said ribs, the outer surfaces of the cork elements being arranged adjacent the cutting edges of the adjacent blades to engage the sheet material with a yielding pressure during the cutting operation, whereby the article will be displaced from the blades as said blades move out of engagement with the remaining portion of said sheet material following the cutting operation.

21. In a machine for cutting articles from sheet material, a platen element and a cutting element both rotatably supported for receiving the sheet material between them, cutters on the cutting element cooperating with the platen element for cutting articles from said sheet material, means for directing the infeeding material to the cutting line at right angles to a direct line between the axes of said rotatable elements, said latter means including a guide member arranged to extend adjacent the cutting element from a position in proximity to the cutting line rearwardly in substantially concentric relation with said cutting element for maintaining the surface of the sheet material engaged by the cutters substantially normal to said cutters as the same approaches the cutting line, and means for feeding the sheet material along said guide member.

22. In a machine for cutting articles from sheet material, opposed rollers arranged to receive the material between them, one of said rollers having a plurality of axially extending peripheral grooves and ribs arranged in alternate relation with each other circumferentially of the roller, a pair of flat cutting blades seated in each groove against corresponding edgewise faces of the ribs and having their cutting edges arranged to impinge the sheet material against the periphery of the other roller for cutting the articles from said material, a filler piece secured in said groove between and against the blades for holding the latter in operative position, oppositely curved end cutting blades extending across opposite ends of said grooves having their ends abutting against corresponding ends of said flat blades, additional oppositely curved end cutting blades extending across opposite ends of said ribs having their ends abutting against corresponding ends of said flat blades abutted by the first mentioned end blades, reinforcing members between the first mentioned end cutting blades and adjacent ends of the filler pieces, additional reinforcing members between the second mentioned end cutting blades and the ribs, and means for securing the end blades and reinforcing members to the corresponding roller including clamping collars secured to adjacent ends of the roller in engagement with the outer convex faces of the corresponding end blades.

23. A machine for cutting articles from sheet material, as in claim 22, wherein the filler pieces and ribs extend longitudinally of the roller beyond the flat cutting blades into engagement with the end portions of the corresponding end cutting blades for maintaining the ends of said end blades in abutting relation with the corresponding ends of the flat blades.

24. A machine for cutting articles from sheet material, as in claim 22, wherein the clamping collars are formed from a plurality of segments, and means securing each segment to the corresponding roller independently of the remaining segments.

OSCAR C. KAVLE.